A. COLLARD.
APPARATUS FOR RECOVERING SOLVENT VAPORS FROM AIR, &c.
APPLICATION FILED DEC. 21, 1909.
1,003,089.
Patented Sept. 12, 1911.
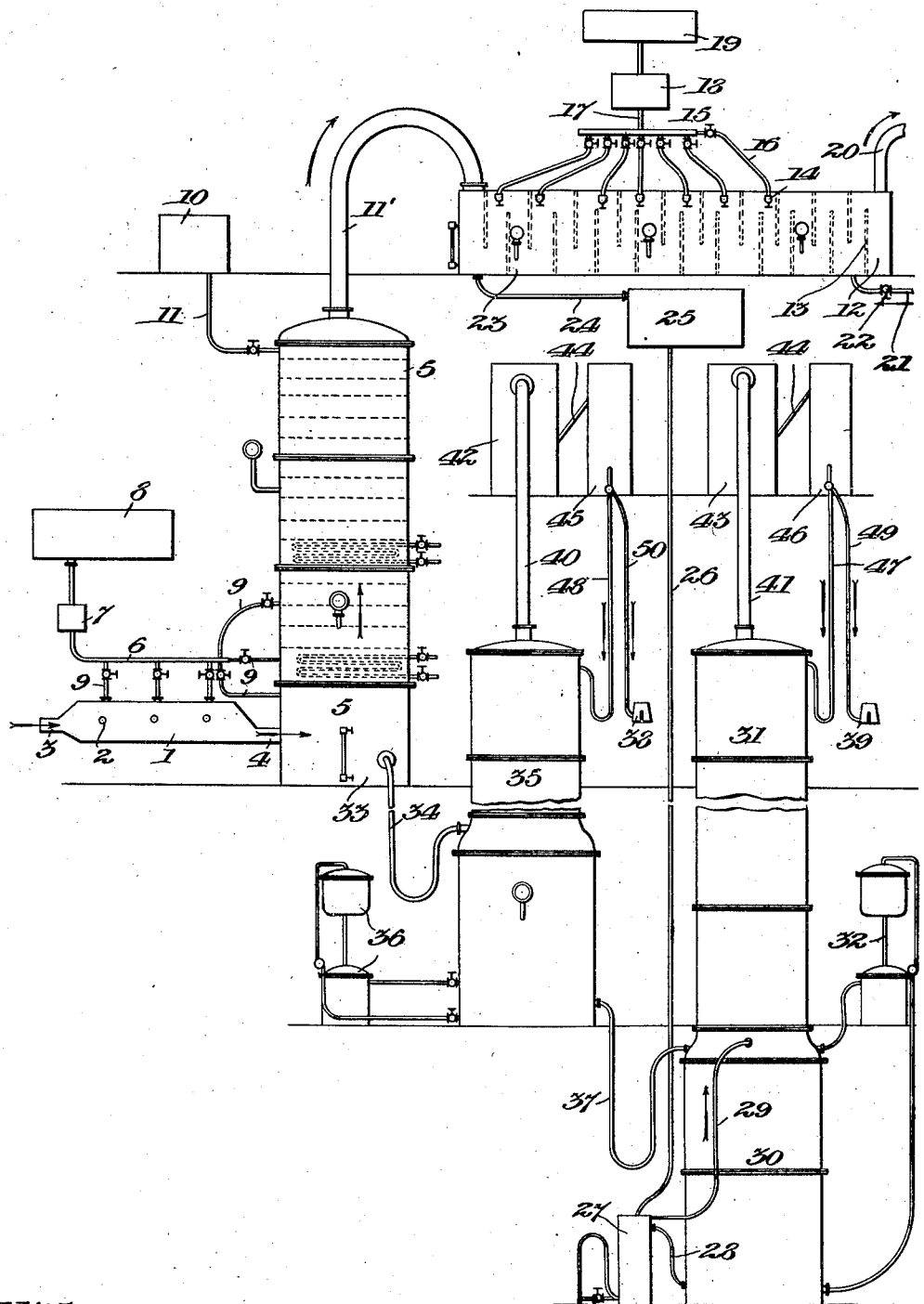

UNITED STATES PATENT OFFICE.

ANTOINE COLLARD, OF MOLENBEEK, NEAR BRUSSELS, BELGIUM.

APPARATUS FOR RECOVERING SOLVENT VAPORS FROM AIR, &c.

1,003,089.   Specification of Letters Patent.   Patented Sept. 12, 1911.

Application filed December 21, 1909. Serial No. 534,386.

*To all whom it may concern:*

Be it known that I, ANTOINE COLLARD, a subject of the King of Belgium, residing at Molenbeek, near Brussels, Belgium, have invented certain new and useful Improvements in Apparatus for Recovering Solvent Vapors from Air, &c., of which the following is a specification.

This invention relates to apparatus for the recovering of by-products which are contained in the state of vapor or gases from artificial silk works, smokeless powder and nitroglycerin works, and the like. The appartus is directed chiefly to the recovery of such by-products as ether, alcohol, acetone, and the like, these substances being employed as solvents in the manufactures above indicated.

A principal object of the invention is to provide an apparatus whereby these valuable by-products may be completely recovered.

The apparatus is illustrated in the accompanying drawing, in which:—

The numeral 1 indicates a collector adapted to receive the air containing the gases or vapors to be recovered. This collector may consist of a suitable horizontal cylinder or other vessel, and is provided in its sides with a suitable number of sight openings 2. The collector 1 is provided at one of its ends with an opening 3 for the admission of the air containing the by-products which are to be recovered. The other end of the collector is connected at 4 with the bottom part of the recovering column 5. Situated above the collector 1 is a solvent collector 6, connected with a solvent filter 7 which latter is connected with the elevated solvent vat 8. The collector 6 is provided with a series of atomizers 9 which open into the collector 1 and into the lower part of the recovering column 5, and distribute a suitable solvent into intimate contact with the gaseous mixture which enters the collector, the solvent to be chosen according to the by-product which it is desired to recover. The recovering column 5 contains a series of plates provided with superposed caps. Situated above the recovering column 5 is a second solvent vat 10, which contains the same solvent as that contained in the vat 8. The solvent vat 10 is connected with the recovering column 5 by means of a pipe or duct 11. The column 5 contains coils of pipe within its interior for the purpose of cooling the contents of the column 5, the cooling action being controllable as desired. Thermometers which will indicate the temperature of the contents of the column 5 are also inserted in said column. The upper part of the column 5 is connected by a bent pipe 11′ with a gas washer 12. The latter contains a plurality of baffle plates 13, and carries at its top a tubular collector 15, which latter is connected by means of pipes 16 with atomizers 14 contained within the washer 12. These atomizers 14 serve to atomize a solvent introduced into the washing apparatus 12. The collector 15 is connected by a pipe 17 with a solvent filter 18, which in turn is connected with a solvent vat 19 placed above it. The washer 12 is provided at one end with an escape pipe 20 for the gases, and 21 is an escape duct for the solvent, said duct being provided with a cock 22. The apparatus 2 may be provided with suitable pressure gages, 23. The bottom of the washing apparatus 12 is connected by a pipe 24 with a vat 25 for the enriched liquid, and a pipe 26 which descends from vat 25 connects the latter with a recovering apparatus 27. The enriched liquid entering apparatus 27 is heated therein and is distributed therefrom, by means of a pipe 29, to the exhausting column 30, which carries at its top the rectifying apparatus 31. The pipe 28 leads the liquid which escapes in a boiling state from the column 30 into the recovering apparatus 27, where it serves to raise the temperature of the liquid which enters apparatus 27 from the pipe 26. By this means a great saving of fuel is had.

32 designates a steam regulator.

The base 33 of the recovering column 5 is connected by means of a pipe 34 with the distilling and rectifying apparatus 35 which latter is connected with a steam controller 36. The lower part of apparatus 35 is connected by means of a pipe 37 with the exhaust column 30.

38 and 39 are gages which indicate the quantities of the recovered materials.

The apparatus 31 is connected by means of a vertical pipe 41 with a condenser 43, and the apparatus 35 is connected by means of the vertical pipe 40 with a condenser 42. These condensers are connected by means of the pipes 44, 44 with the cooling apparatuses 45 and 46. The bottom part of the latter apparatuses is connected by means of pipes 47 and 48 with the columns 31 and 35 respectively.

49 and 50 represent pipes or ducts which convey the liquid to the gages 39 and 38 respectively.

The operation of the apparatus is as follows:—The gaseous mixture containing by-products such as ether, alcohol, acetone, and the like are driven by means of a suitably disposed air pump into the collecting vessel 1. The atomizing devices 9 produce an intimate mixture of solvent which is delivered from the vat 8, with the said gaseous mixture. The mixed solvent and gaseous mixture passes through the pipe 4 into contact with the column of absorbent liquid which is discharged into the recovering apparatus 5 from the vat 10, and the temperature of the mixture is controlled according to the requirements. This absorbent liquid flows in an opposite direction to the direction of flow of the gaseous mixture; it falls in the form of a spray or shower and takes up and retains the volatile and soluble matters carried by the gaseous mixture. The thus enriched absorbent liquid or solvent is collected in the lower part 33 of the recovering column 5, it having been kept at a desired temperature by means of the coiled pipes hereinbefore referred to.

The gases continue their passage through the bent pipe 11', by which they are led into the washing apparatus 12, where they are subjected to the action of another atomized solvent which is delivered into the washing apparatus 12 from the solvent vat 19. The gases are further intimately mixed with the atomized solvent by means of the baffle plates 13 hereinbefore referred to. The solvent which is delivered from said vat 19 takes up the last traces of the by-products which are to be recovered from the gaseous mixture and of the solvent carried away from the column 5, the solvent from vat 19 circulating freely in the washing apparatus 12 in a direction opposite that of the travel of the gaseous mixture and in proportions which may be controlled at will. The enriched liquid flows into the vat 25, whence it descends by means of the pipe 26 into the heat recovering apparatus 27. From said apparatus 27 the liquid enters the exhausting column 30, and there undergoes boiling, produced either by means of steam or by any other evaporating means. The vapors produced during such ebullition pass into the rectifier 31, from which they pass into the condenser 43 and a refrigerating apparatus 46, by which means they are liquefied. The thus recovered solvent is then permitted to flow off through the pipe 49 into a gage 39 where the amount is measured. A certain amount of the regenerated solvent may be permitted to return into the rectifier 31 by means of pipe 47.

The liquid charged with the by-products recovered from the column 5 flows off through the pipe 34 into the rectifier 35, where it undergoes boiling by means of steam admitted from apparatus 36. Thereafter, the product to be recovered is passed into the condenser 42 and refrigerating apparatus 45. The thus regenerated liquid is allowed to flow off by means of the pipe 50 into the gage 38 where the amount of escaping liquid is controlled and the excess not allowed to escape passes through the pipe 48 into the apparatus 35.

The part of the fractionated liquid which is not evaporated is conveyed by means of pipe 37 into the exhausting column 30, and is added to the liquid which is boiling within the said column. Here the liquid is freed from the last traces of volatile products and escapes through the pipe 28.

I claim:—

1. A system for the recovery of by-products from gaseous mixtures, comprising a vessel into which the gaseous mixture passes, atomizers arranged to deliver solvent into said vessel, a recovering apparatus arranged to receive said gaseous mixture and atomized solvent, means for delivering further quantities of solvent into said recovering apparatus, a washing apparatus arranged to receive the gaseous mixture escaping from said recovering apparatus, atomizers arranged to deliver solvent into said washing apparatus, means for the escape from said washing apparatus of the gases from which the by-products have been separated, a rectifying apparatus arranged to receive the enriched liquid from said washing apparatus, means for causing the distillation of the liquid within said rectifying apparatus, a condenser and refrigerating apparatus arranged to receive the vapors from said rectifying apparatus, a second rectifying apparatus connected with the lower part of said recovering apparatus and arranged to receive the enriched liquid therefrom, means for causing the distillation of the liquid within said rectifying apparatus, and a second condenser and refrigerating apparatus connected with said rectifying apparatus.

2. A system for the recovery of by-products from gaseous mixtures, comprising a vessel into which the gaseous mixture passes, atomizers arranged to deliver solvent into said vessel, a solvent tank disposed above said first named vessel, connections between said tank and said atomizers, a recovering apparatus arranged to receive said gaseous mixture and atomized solvent, connections between said first named vessel and said recovering apparatus, means for delivering further quantities of solvent into said recovering apparatus, means for controlling the temperature within said recovering apparatus, a washing apparatus arranged to receive the gaseous mixture escaping from said recovering apparatus, atomizers arranged to deliver solvent into said washing apparatus, means for the escape from said washing apparatus of the gases from which the by-products have been separated, baffle plates arranged within said washing apparatus, a rectifying apparatus arranged to receive the enriched liquid from said washing apparatus, means for causing the distillation of the liquid within said rectifying apparatus, a condenser and refrigerating apparatus arranged to receive the vapors from said rectifying apparatus, a gage for controlling the amount of liquid escaping from said refrigerating apparatus, a second rectifying apparatus connected with the lower part of said recovering apparatus and arranged to receive the enriched liquid therefrom, means for causing the distillation of the liquid within said rectifying apparatus, a second condenser and refrigerating apparatus connected with said rectifying apparatus, and a second gage for controlling the amount of liquid escaping from said second named refrigerating apparatus, substantially as described.

In testimony whereof I have hereunto set my hand in presence of two witnesses.

ANTOINE COLLARD.

Witnesses:
S. M. SUDLOK,
GREGORY PHELAN.